G. B. LARRICK.
FRUIT STONE AND CORE EXTRACTOR.
APPLICATION FILED OCT. 6, 1910.
989,162.
Patented Apr. 11, 1911.
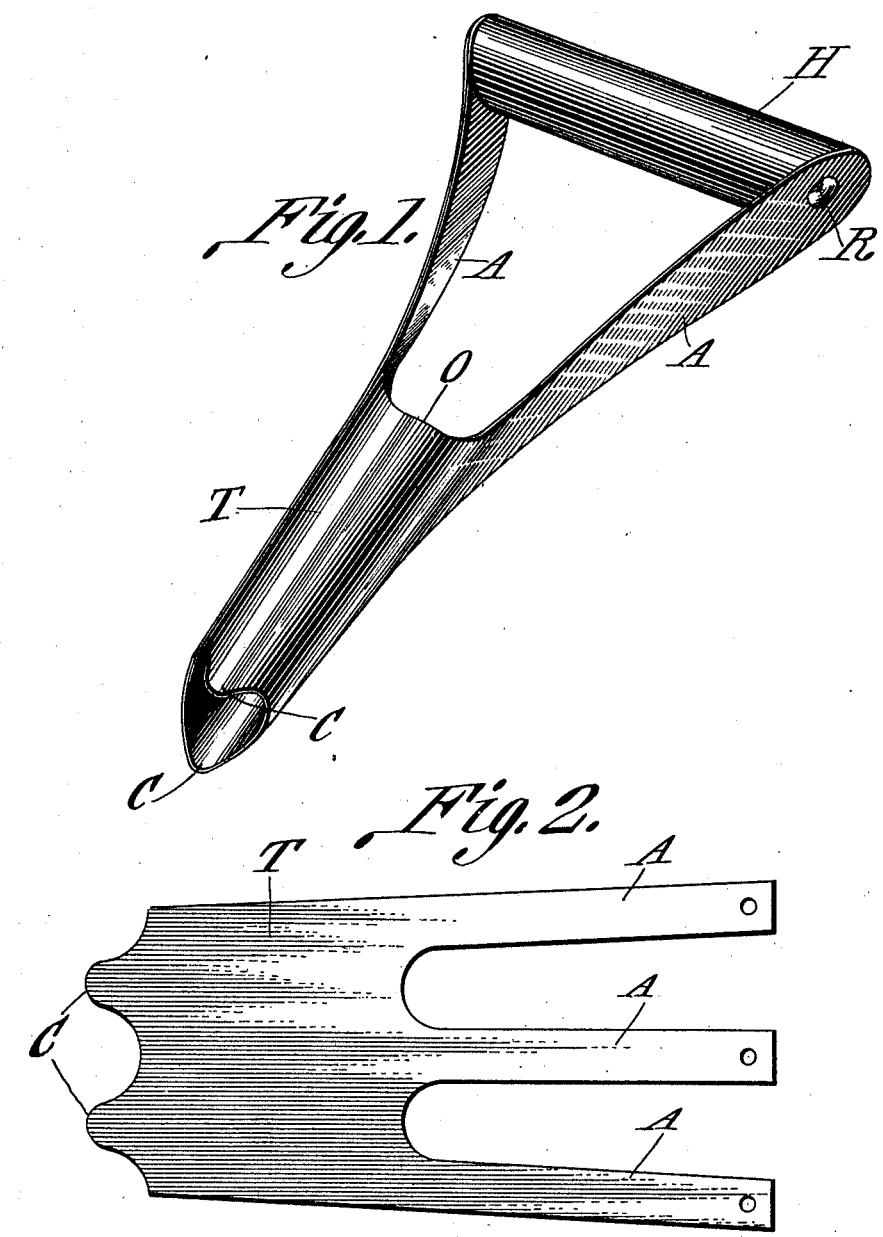
George B. Larrick
Inventor
by C. A. Snow & Co.
Attorneys
Witnesses

UNITED STATES PATENT OFFICE.

GEORGE B. LARRICK, OF LEXINGTON, VIRGINIA.

FRUIT STONE AND CORE EXTRACTOR.

989,162.                  Specification of Letters Patent.        Patented Apr. 11, 1911.

Application filed October 6, 1910.   Serial No. 585,652.

*To all whom it may concern:*

Be it known that I, GEORGE B. LARRICK, a citizen of the United States, residing at Lexington, in the county of Rockbridge and State of Virginia, have invented a new and useful Fruit Stone and Core Extractor, of which the following is a specification.

This invention relates to vegetable cutters, and more especially to that class of devices known as pitters and corers; and the object of the same is to produce an extremely simple device which will extract the stone or core from a piece of fruit by a single operation and which can not become clogged in use.

To this end the invention consists in the specific details of construction hereinafter more fully described and claimed and as shown in the drawings wherein—

Figure 1 is a perspective view of this device complete; and Fig. 2 is a plan view of the blank from which it is made.

Referring to the said drawings, the letter T designates a tubular body tapering slightly throughout its length from its lower end beyond which project oppositely disposed cutters C, to its upper end which forms the outlet as designated by the letter O, above which point the sides of the tube are continued upward in slightly diverging arms A, A connected at their upper extremities by a rivet or pin R upon which is rigidly mounted a handle H. The latter is of wood, while all the rest is of metal.

In Fig. 2 is shown the blank from which the metallic part is made. Here it will be seen that the body which forms the tube T is scalloped at one end thereof forming the two oppositely disposed cutters C, and its other end is cut into three strips A, two of which in the finished article overlap throughout to form one of the arms and the intermediate of which forms the other arm as seen. These arms are disposed opposite to each other but on a diametrical line at right angles to the diametrical line in which the cutters stand, and hence there can be no seam through either of the latter which would interfere with its cutting action and render it difficult to grind. The seam will extend up one side of the tubular body T where the edges of the blank overlap each other, and along that arm A which is of double thickness as the metal here also is overlapped and therefore rendered stiff.

Heretofore it has been common to make devices of this character either with a straight tubular body having cutters at one of its extremities, or with a slightly tapering body having cutters at its smaller end and a side outlet for the fruit stone, and above said outlet a handle of some kind. The use of a side outlet renders the device extremely liable to become dirty, and difficult of cleansing, and moreover it must be held in one position in order that the stone cut from the fruit can be ejected properly; whereas the use of two outlets as shown in the drawings herewith renders the device easy to clean and presents no obstruction to the ejection of the stone or core which is cut from the fruit in a well known manner. Moreover, with an open handle such as shown, the device can more easily be manipulated, or hung up when not in use. The whole is made from sheet metal such as zinc or galvanized iron, and the cutters C are sharpened as by grinding off their surface on the outside.

What is claimed as new is:

The herein described fruit stone and core extractor, the same comprising a single piece of sheet metal rolled into the form of a tapering tube and having oppositely disposed cutters projecting beyond its smaller extremity, a single arm projecting beyond its larger extremity at one side, and a pair of lapped arms projecting from its larger extremity at the opposite side and continuing the line along which the edges of the sheet are joined said arms standing in a line at right angles to a line through said cutters; and a handle secured between the outer ends of said arms.

In testimony that I claim the foregoing as my own, I have hereto affixed my signature in the presence of two witnesses.

GEORGE B. LARRICK.

Witnesses:
NANNIE LARRICK,
E. S. SHIELDS.

Copies of this patent may be obtained for five cents each, by addressing the "Commissioner of Patents, Washington, D. C."